US007564683B2

(12) United States Patent  
Hood, III et al.

(10) Patent No.: US 7,564,683 B2
(45) Date of Patent: Jul. 21, 2009

(54) COOLING SUBSYSTEM WITH EASILY ADJUSTABLE MOUNTING ASSEMBLY

(75) Inventors: Charles D. Hood, III, Cedar Park, TX (US); Jason A. Shepherd, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 11 days.

(21) Appl. No.: 11/848,048

(22) Filed: Aug. 30, 2007

(65) Prior Publication Data

US 2009/0059513 A1 Mar. 5, 2009

(51) Int. Cl.
*H05K 5/00* (2006.01)
*F16B 43/00* (2006.01)

(52) U.S. Cl. .................... 361/683; 361/752; 361/807; 361/809; 361/759; 411/372

(58) Field of Classification Search .................. None
See application file for complete search history.

(56) References Cited

U.S. PATENT DOCUMENTS

| | | | | |
|---|---|---|---|---|
| 1,071,999 | A * | 9/1913 | Gilson ........................ 292/228 |
| 4,546,408 | A * | 10/1985 | Rodseth et al. ............. 361/720 |
| 5,754,412 | A * | 5/1998 | Clavin ........................ 361/804 |
| 5,987,893 | A | 11/1999 | Schulz-Harder et al. |
| 6,341,490 | B1 | 1/2002 | Jones |
| 6,471,310 | B2 * | 10/2002 | Montagna ................ 312/223.2 |
| 6,543,098 | B2 * | 4/2003 | Meyer et al. .................. 24/289 |
| 6,549,410 | B1 * | 4/2003 | Cohen ........................ 361/704 |
| 6,725,682 | B2 | 4/2004 | Scott |
| 6,726,505 | B2 * | 4/2004 | Cermak et al. .............. 439/567 |
| 7,034,223 | B2 * | 4/2006 | Fan et al. ...................... 174/51 |
| 7,042,727 | B2 * | 5/2006 | Ulen et al. .................. 361/704 |
| 7,227,761 | B2 * | 6/2007 | Estes et al. .................. 361/810 |
| 2003/0175091 | A1 * | 9/2003 | Aukzemas et al. .......... 411/107 |
| 2003/0188538 | A1 | 10/2003 | Chu et al. |
| 2005/0146850 | A1 | 7/2005 | Meir |
| 2006/0082971 | A1 | 4/2006 | Artman et al. |
| 2008/0100521 | A1 * | 5/2008 | Herbert et al. .............. 343/713 |

FOREIGN PATENT DOCUMENTS

EP 1 684 031 A2 7/2006
GB 2 322 732 A1 2/1998

OTHER PUBLICATIONS

"H2Ceramic Cooling: a Two-Stage Liquid/TEC Hybrid Cooling System for Over-Clocked CPUs," Wayne Caswell et al., Dell, Inc. White Paper, Oct. 2006.
"Overclocking," Wayne Caswell, Dell, Inc. White Paper, Oct. 2006.

* cited by examiner

*Primary Examiner*—Boris L Chervinsky
(74) *Attorney, Agent, or Firm*—Larson Newman Abel & Polansky, LLP

(57) ABSTRACT

An apparatus for mounting a motherboard includes a mounting boss and a boss backing. The mounting boss is alignable in a first orientation with a first hole spacing in the motherboard, and alignable in a second orientation with a second hole spacing in the motherboard. The boss backing is adapted to connect with the mounting boss in the first orientation through the motherboard having the first hole spacing, and adapted to connect with the mounting boss in the second orientation through the motherboard having the second hole spacing.

20 Claims, 8 Drawing Sheets

COOLING SUBSYSTEM WITH EASILY ADJUSTABLE MOUNTING ASSEMBLY

FIELD OF THE DISCLOSURE

This disclosure generally relates to information handling systems, and to heatsinks.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems include processors, which produce heat. In information handling systems such as desktop computers, the heat produced by the processors is typically managed with air cooling. However, air cooling has inherent limitations that may be exceeded by microprocessors that are increasingly dense and powerful. Thermoelectric coolers (TEC) to improve thermal performance have therefore been proposed. U.S. patent application Ser. No. 11/580, 671, filed Oct. 13, 2006, the disclosure of which is hereby incorporated by reference, shows a system and method for heat dissipation including a TEC. A TEC is normally mounted in thermal and physical communication with the motherboard and processor in a personal computer to dissipate the heat produced. Personal computer users often desire to install a new motherboard as new processors and chipsets become available, but continue to use the same TEC. The differences in the mounting arrangements of the upgraded packages may prevent such a modification, however.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
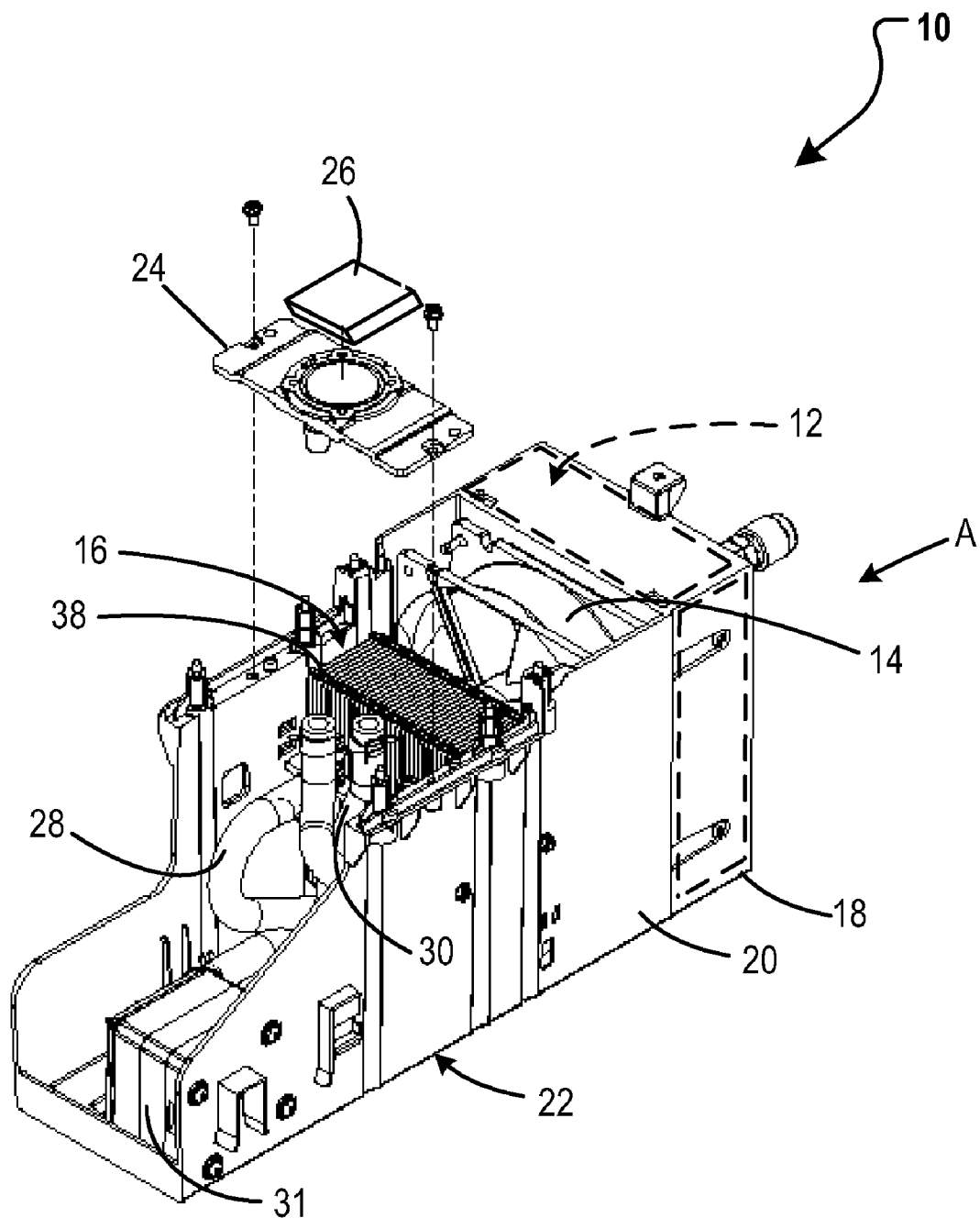
FIG. 1 is a partially exploded perspective view of a hybrid heat exchanger.

FIG. 1 shows a hybrid heat exchanger 10 for an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The hybrid heat exchanger 10 includes a passive heat exchanger or radiator 12, a fan 14 and a thermoelectric cooler (TEC) assembly 16. The radiator 12 is preferably disposed in a shroud 18, while the fan 14 and the TEC assembly 16 are disposed in a subassembly 20. The shroud 18 and the subassembly 20 together form a module 22. A micro-channel cold plate 24 is also disposed within the subassembly 20, and is adapted for physical and/or thermal communication with the CPU 26 (shown schematically). The micro-channel cold plate 24 is also adapted for fluid communication with a pair of conduits 28 and 30. A pump 31 circulates liquid coolant, such as water, to and/or from the radiator 12 and through the conduits 28 and 30 in well-known fashion.

The fan 14 draws air inwardly in the direction of arrow A through the radiator 12. The temperature of the coolant circulated by the pump 31 is thereby lowered, and the ambient temperature of the incoming airflow is correspondingly raised as it is drawn into the subassembly 20. The airflow is thereafter directed by the fan 14 through the TEC assembly 16 where it picks up heat from the fins of the heat sink 38.

Figure 2:
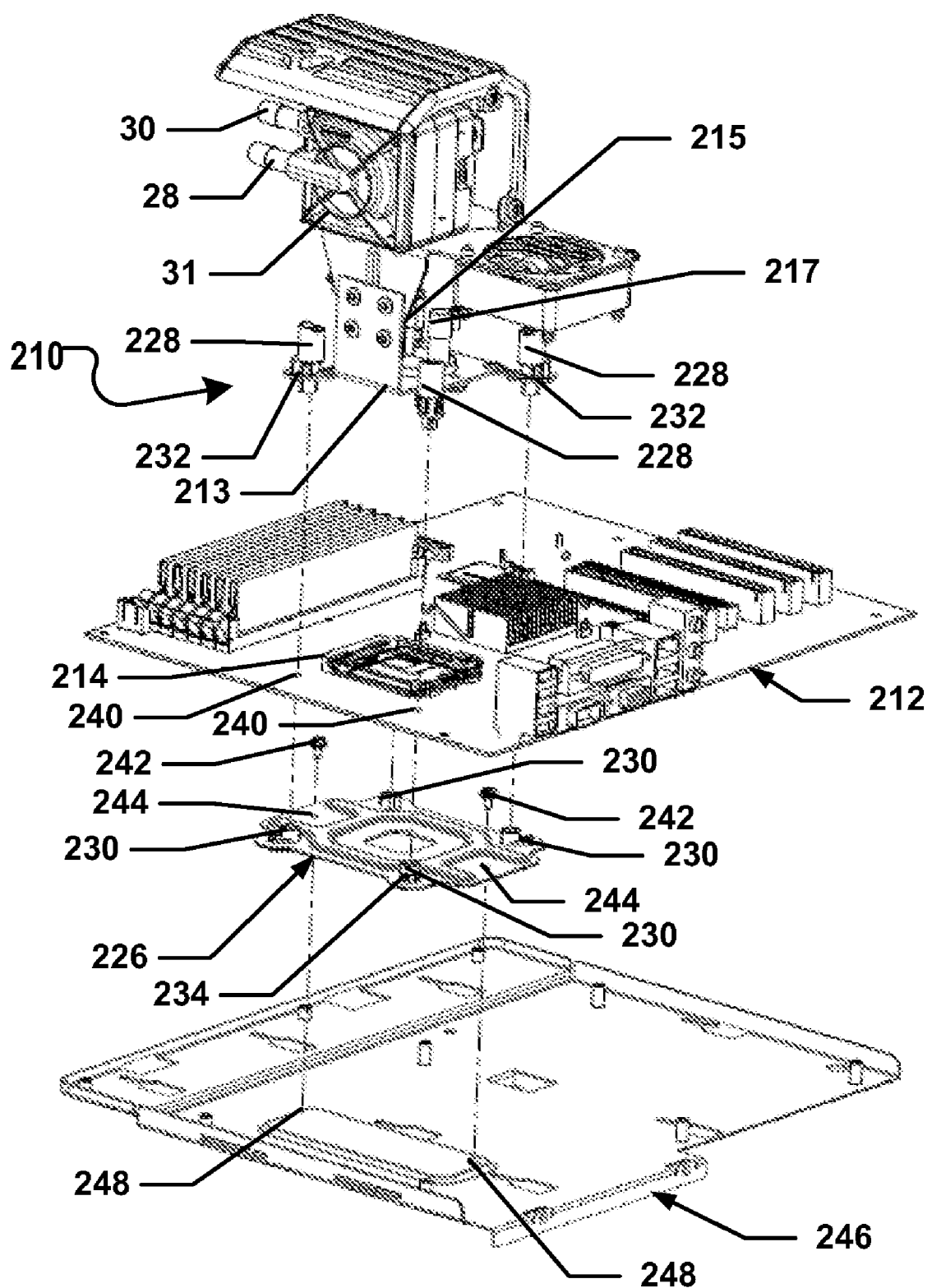
FIG. 2 is an exploded perspective view of an embodiment of an adjustable mounting assembly attached to a liquid cooling subsystem.
Figure 3:
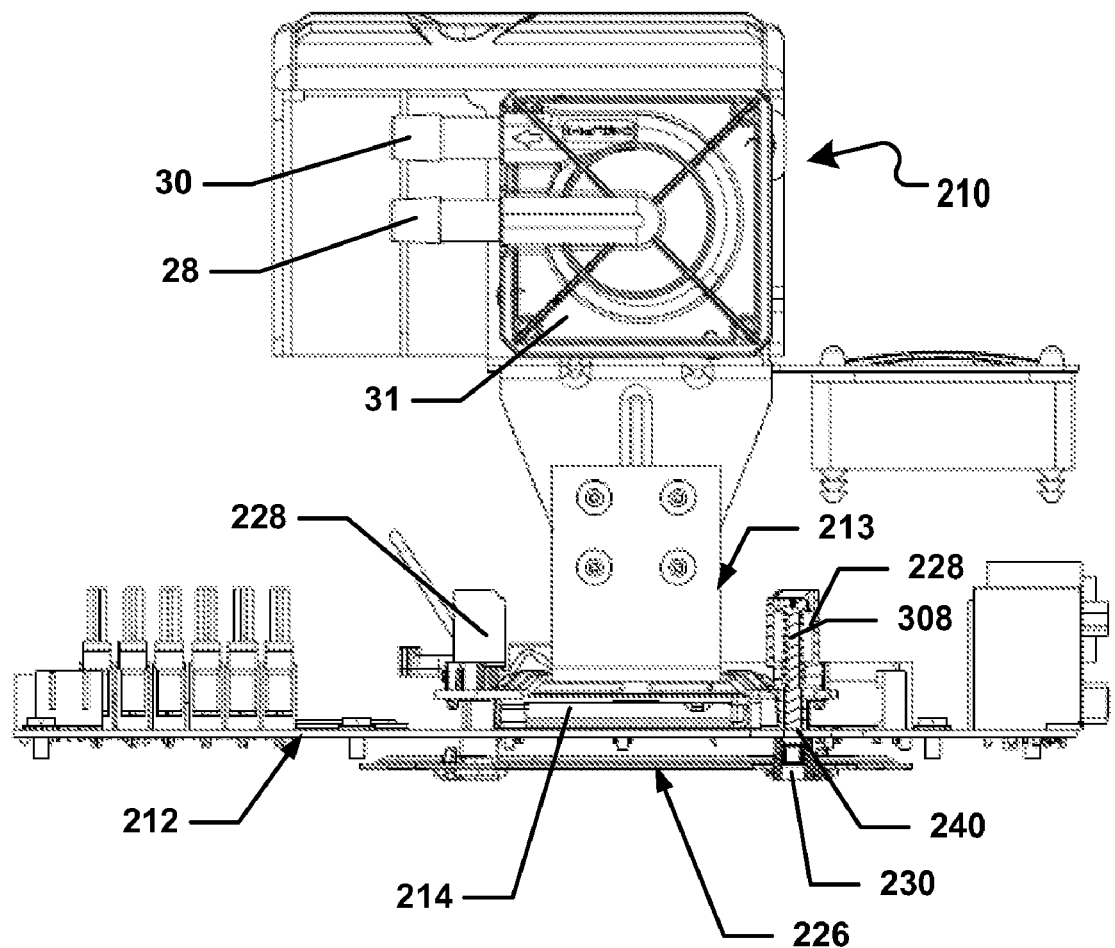
FIG. 3 is a side view of the adjustable mounting assembly and liquid cooling subsystem shown in FIG. 2.

FIGS. 2 and 3 show an alternative embodiment in which the pump 31 forms part of a liquid cooling subsystem 210 situated generally above a motherboard 212. The liquid cooling subsystem 210 includes a mounting bracket 213 that, like the micro-channel cold plate 24 (FIG. 1), is adapted for physical and/or thermal communication with a CPU 214 mounted on the motherboard 212. The pump 31 circulates coolant to the mounting bracket 213 through conduits 215 and 217 that run proximate to the CPU 214. The liquid cooling subsystem 210 does not necessarily include the TEC assembly 16 of FIG. 1. However, the liquid cooling subsystem 210 may be combined with the radiator 12 and the fan 14 to create a cooling subsystem that operates similarly to the hybrid heat exchanger 10.

The mounting bracket 213 forms part of an adjustable mounting assembly that also includes a backing plate 226, a plurality of adjustable mounting bosses 228, and a plurality of boss backings 230. The mounting bracket 213 has a plurality of openings 232, preferably oval in shape and spaced apart from but extending diagonally from the center of the mounting bracket, for receiving the mounting bosses 228. The backing plate 226 similarly has a plurality of openings 234, also preferably oval in shape and spaced apart from but extending diagonally from the center of the backing plate, for receiving the boss backings 230. Each mounting boss 228 snap fits into its corresponding opening 232, and each boss backing 230 snap fits into its corresponding opening 234. The mounting bracket 213 and the backing plate 226 preferably surround the CPU 214 such that the openings 232 in the mounting bracket and the openings 234 in the backing plate align with corresponding mounting holes 240 in the motherboard 212. When so aligned, the mounting bosses 228 connect with counterpart boss backings 230 to hold the adjustable mounting assembly together.

Figure 4:
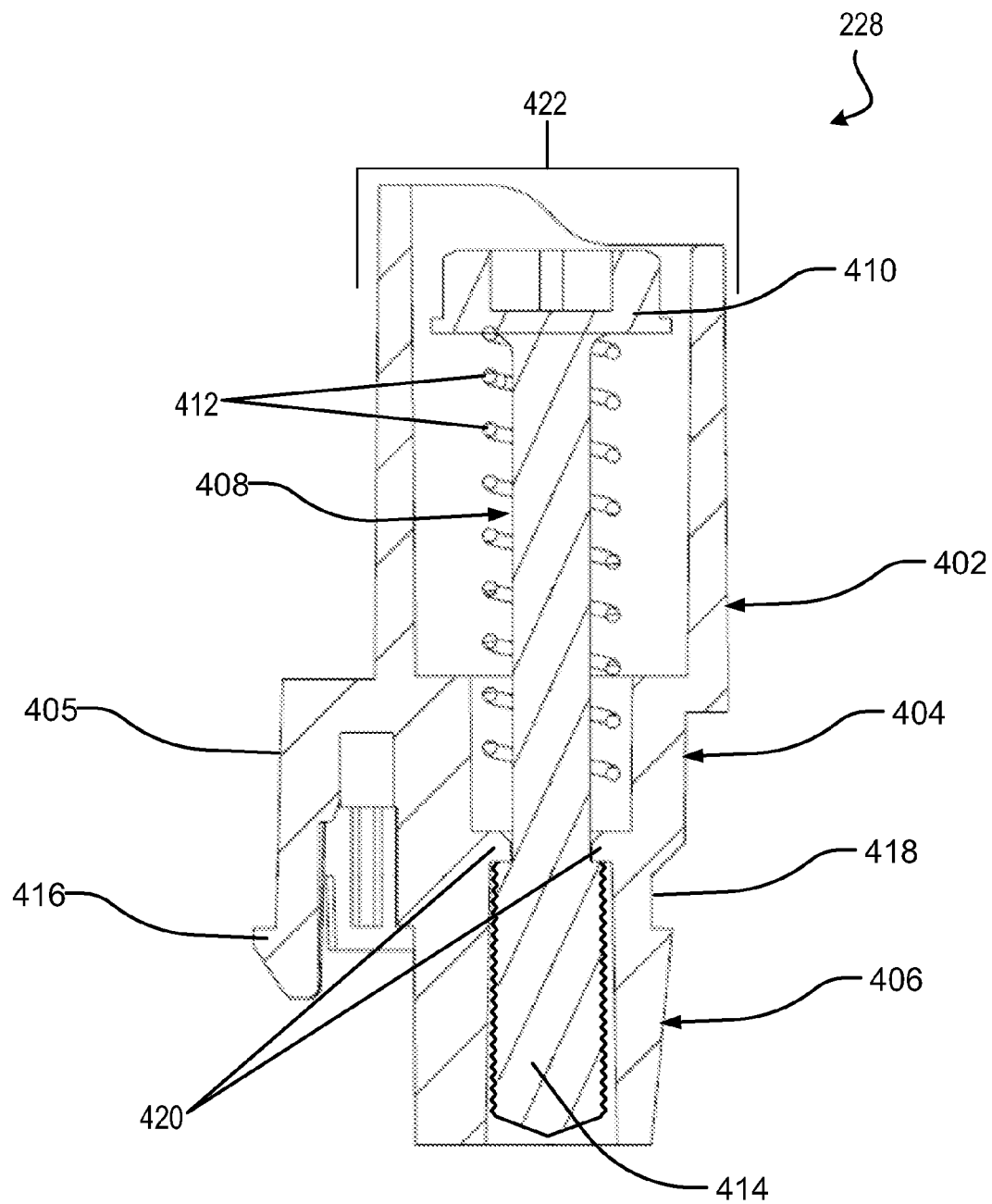
FIG. 4 is a cross-sectional view of an adjustable mounting boss.

FIG. 4 shows the adjustable mounting boss 228 including an upper portion 402, a middle portion 404, and a lower portion 406. The upper portion 402 and the lower portion 406 are cylindrical in shape and concentric to form a main cylindrical portion 422. The middle portion 404 includes an offset portion having a flexible depending wall 405 that terminates in a hook 416. The boss 228 thus may be inserted into the opening 232 until the hook 416 penetrates through the opening 232 and snaps back to its original shape, at which time the opposite edge of the opening engages a notch 418 formed in the side of the boss. As a whole, the periphery of the middle portion 404 preferably has a shape that closely aligns with the opening 232 in order to provide a tight fit between the adjustable mounting boss 228 and the mounting bracket 213.

A screw 408 is movable between a retracted position as shown and an extended position. The screw 408 extends through the interiors of the upper portion 402, the middle portion 404, and the lower portion 406. The interior of the middle portion 404 includes a cylindrical lip 420 to guide the screw 408 along the interior of the adjustable mounting boss 228. The screw 408 includes a head 410 and a tip 414. A spring 412 is disposed between the head 410 and the lip 420 to bias the screw 408 toward the retracted position within the mounting boss 228 so that the motherboard is not scraped during placement of the adjustable mounting assembly. During connection of the mounting boss 228 and the boss backing 230, a screwdriver bit may be captured in the upper portion 402 to prevent the screwdriver from slipping off of the screw 408 and damaging the motherboard 212. The adjustable mounting boss 228 is preferably made of plastic or any other nonconductive material so that the adjustable mounting boss does not short any traces on the motherboard 212 routed near the mounting holes 240.

Figure 5:
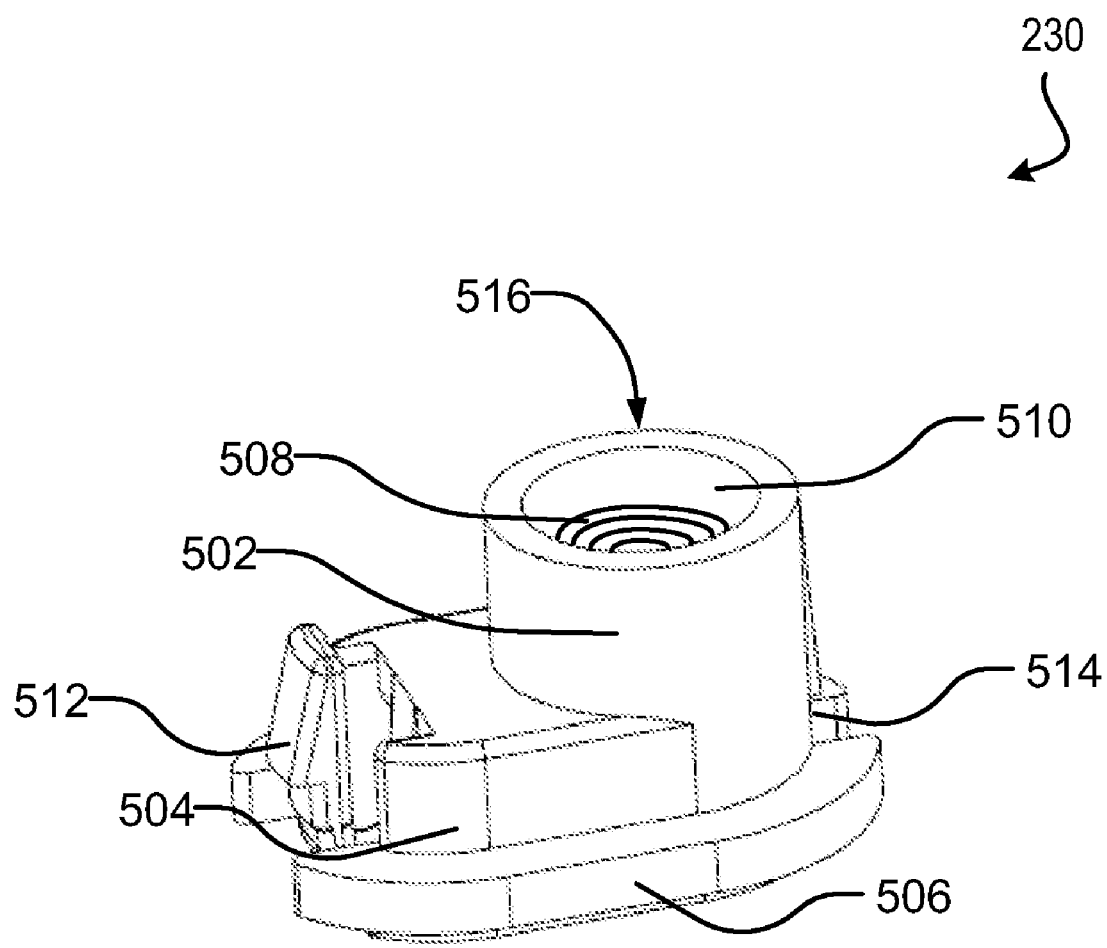
FIG. 5 is a perspective view of a boss backing.
Figure 6:
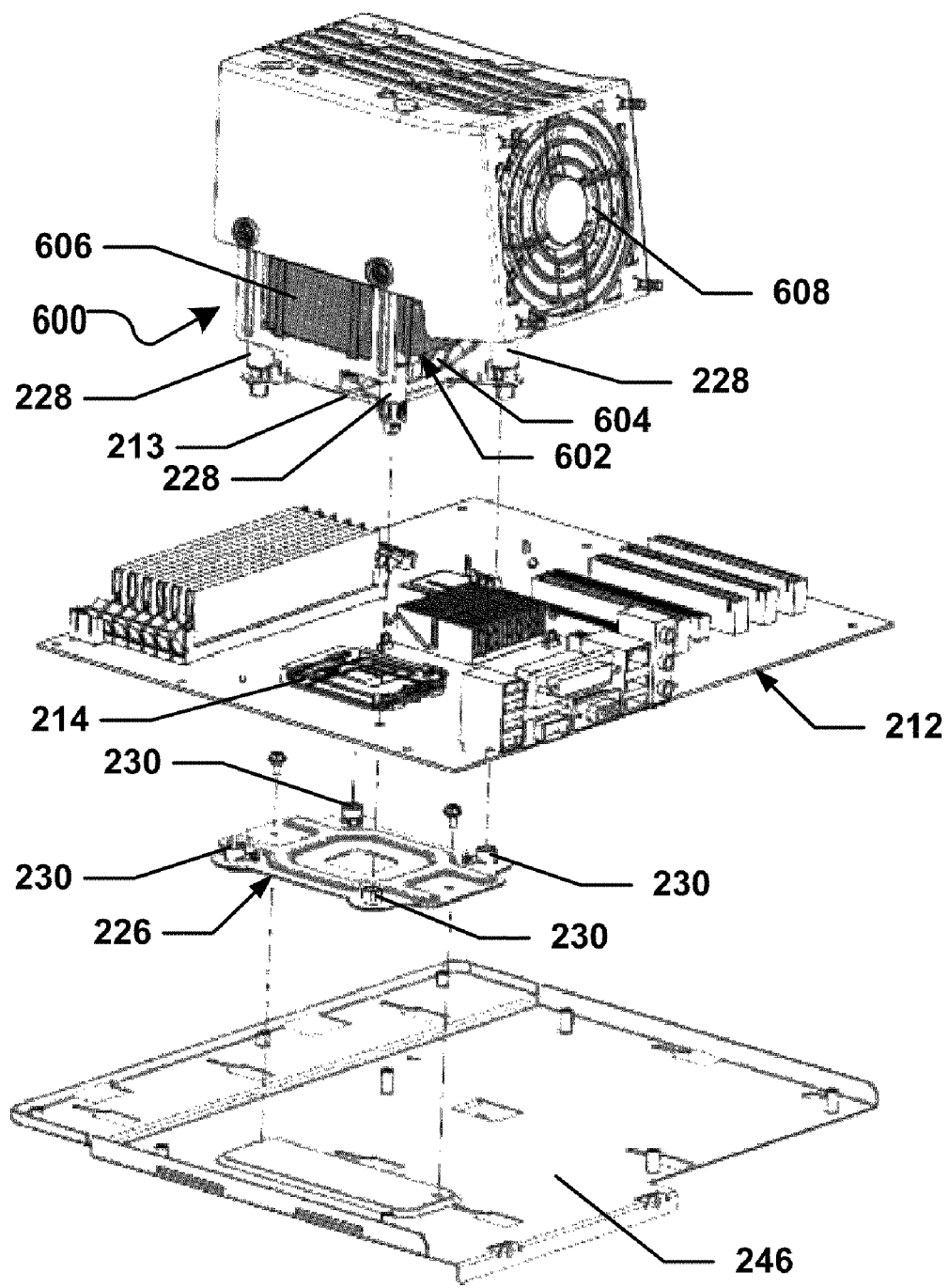
FIG. 6 is a partially exploded perspective view of an embodiment of the adjustable mounting assembly attached to a heat sink subsystem.

FIG. 5 shows the boss backing 230 including an upper portion 502, a middle portion 504, and a lower portion 506. The upper portion 502 is preferably cylindrical and offset to one side of the middle portion 504 and the lower portion 506 to form an offset cylindrical portion 516. The boss backing 230 may be inserted into the opening 234 of the backing plate 226 either in a first orientation as shown in FIG. 2, or in a second orientation rotated 180 degrees about the z axis (with the mounting bosses 228 similarly rotated) as shown in FIG. 6, in order to accommodate different hole spacings on the motherboard 212. In the first orientation with the backing 230 as shown, the offset cylindrical portion 516 is disposed closer to the CPU 214 than in the second orientation. The upper portion 502 of the boss backing 230 includes an opening 510 for receiving the tip 414 of the screw 408. An interior portion 508 of the upper portion 502 is chamfered inwardly and threaded to allow some leeway in accepting the tip 414 of the screw 408 as the screw is extended into the opening 510.

The middle portion 504 includes a hook 512 and a recess 514 to enable the boss backing 230 to snap fit within the opening 234 of the backing plate 226 (FIG. 2). The periphery of the middle portion 504 is preferably closely shaped to match the openings 234, regardless of the orientation of the backings 230. The lower portion 506 is wider than the opening 234 of the backing plate 226 so that the boss backing 230 is held securely on the backing plate. The boss backing 230 may be removed from the opening 234 by pulling the hook 512 away from the edge of the opening and pushing the boss backing out. Upon removing the boss backing 230, it may be re-inserted in the opposite orientation, as stated above. The boss backing 230 is preferably made of plastic or any other nonconductive material so that the boss backing does not short any traces on the motherboard 212 that may be routed close to the mounting holes 240.

Referring again to FIGS. 2 and 3, the mounting holes 240 on the motherboard 212 may be spaced at various distances from the center of the CPU 214. The mounting holes 240 are closer to the CPU 214 in a first hole spacing than in a second hole spacing. The adjustable mounting boss 228 and the boss backing 230 are inserted into the openings 232 and 234 in the first orientation when the mounting holes 240 are positioned in the first hole spacing, and are inserted in the second orientation when the mounting holes 240 are positioned in the second hole spacing. FIGS. 2 and 3 show the adjustable mounting boss 228 and the boss backing 230 inserted in the first orientation, to enable the first and second offset portions 422 and 516 to align with the mounting holes 240 placed in the first hole spacing on the motherboard 212. The backing plate 226 also may fasten to a computer chassis 246 with a plurality of screws 242 that pass through a plurality of holes 244 in the backing plate and that insert into a corresponding plurality of holes 248 on the computer chassis. As the screws 242 are tightened, the backing plate 226 and the chassis 246 are held securely together. During the installation of a new motherboard 212, the screws 242 may be removed and then reattached to allow proper installation of the new motherboard.

Figure 7:
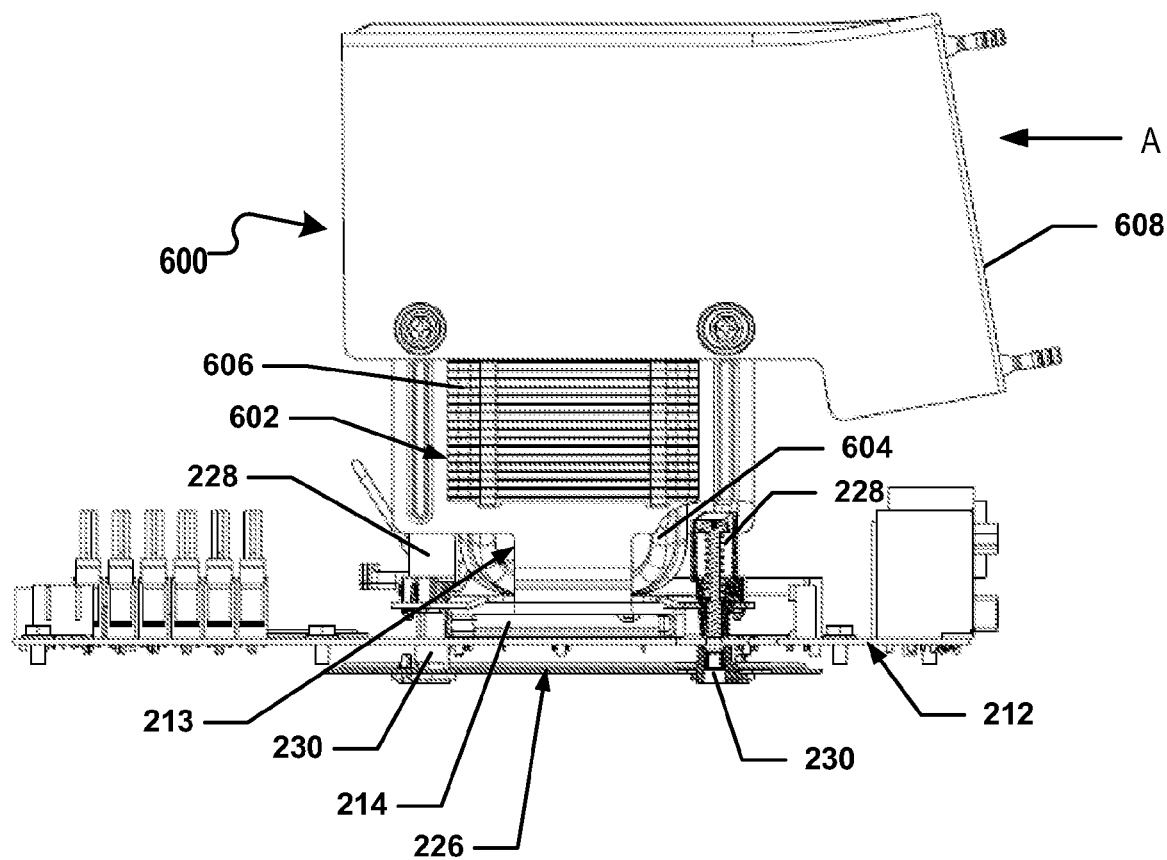
FIG. 7 is a side view of the adjustable mounting assembly and heat sink subsystem shown in FIG. 6.

FIGS. 6 and 7 show an alternative embodiment in which a heat sink subsystem 600, including a heat sink 602, is substituted for the liquid cooling subsystem 210 and the pump 31 of FIGS. 2 and 3. Like the liquid cooling subsystem 210, the heat sink subsystem 600 is preferably used to dissipate heat from the CPU 214. The heat sink subsystem 600 also preferably includes the adjustable mounting assembly having the mounting bracket 213, the backing plate 226, the adjustable mounting bosses 228, and the boss backings 230. The heat sink 602 preferably includes a plurality of heat pipes 604 extending away from the mounting bracket 213, and a plurality of fins 606 supported by the heating pipes, to dissipate the heat produced by the CPU 214. The adjustable mounting assembly is preferably connected to the motherboard 212, the CPU 214, and the computer chassis 246 in the same manner as stated in the description of FIGS. 2 and 3 above.

Figure 8:
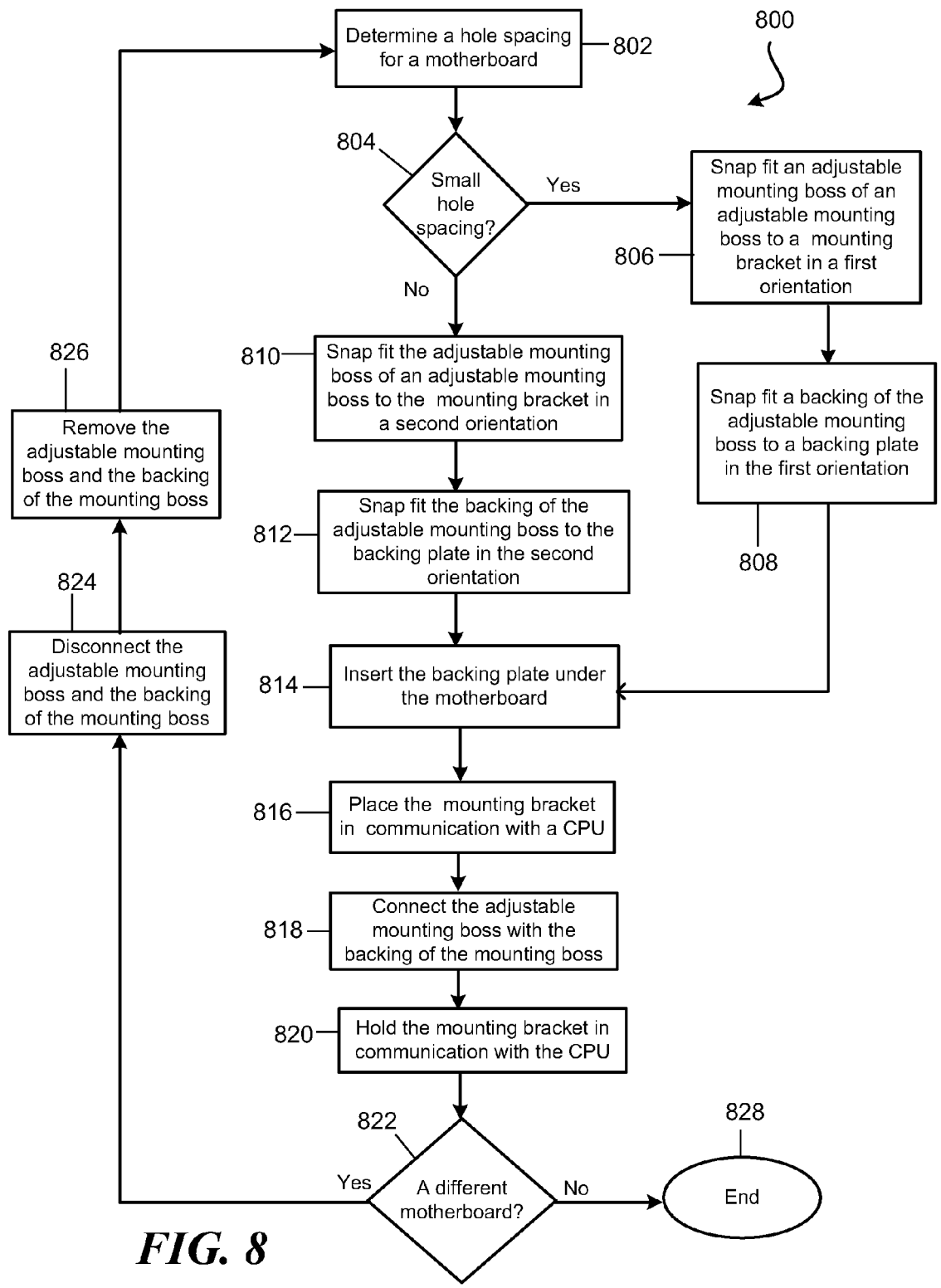
FIG. 8 is a flow chart of a method for installing the adjustable mounting assembly.

FIG. 8 shows a flow chart of a method 800 for installing an adjustable mounting assembly. At block 802, a hole spacing for a motherboard is determined. Typically, there are two different hole spacings possible for a motherboard. The hole spacing is determined by the distance the mounting holes are from the center of the motherboard. A decision is made whether the hole spacing is a small hole spacing at block 804. At block 806, if the hole spacing is the smaller of the two possibilities, then an adjustable mounting boss is snap fitted to a mounting bracket in a first orientation. A boss backing is snap fitted to a backing plate in the first orientation at block 808. The adjustable mounting boss and the boss backing are snap fitted with the same orientation so that there is proper alignment to form a connection between them. At block 810, if the hole spacing is not the smaller possibility, then the adjustable mounting boss is snap fitted to the mounting bracket in a second orientation. The boss backing is snap fitted to the backing plate in the second orientation at block 812.

At block 814, the backing plate is inserted under the motherboard. The backing plate preferably holds the mounting bracket in proper alignment with the motherboard. The mounting bracket is placed in thermal communication with a CPU at block 816. The thermal communication between the mounting bracket and the CPU removes heat from the CPU to the mounting bracket. At block 818, the adjustable mounting boss and the boss backing are connected together. The adjustable mounting boss and boss backing are preferably connected by a screw attached to the interior of the adjustable mounting boss being inserted into the boss backing. The mounting bracket is held in thermal communication with the CPU at block 820. The connection formed between the adjustable mounting boss attached to the mounting bracket and the boss backing attached to the mounting holds the mounting bracket in thermal communication with the CPU.

At block 822, a determination is made whether or not a different motherboard is to be attached to the adjustable mounting assembly. If a different motherboard is to be attached, the adjustable mounting boss and the boss backing are disconnected at block 824. The screw connecting the adjustable mounting boss and the boss backing is removed from the boss backing. The mounting bracket and the backing plate can be removed from around the motherboard and the CPU. At block 826, the adjustable mounting boss is removed from the mounting bracket, and the boss backing is removed from the backing plate. The adjustable mounting boss and the boss backing are removed so that they can be inserted in the proper orientation for the next motherboard. The method continues, as stated above, at step 802. However, if there is not a different motherboard to be attached the adjustable mounting assembly, the mounting bracket remains in thermal communication with the CPU and the method ends at block 828.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An apparatus for mounting a cooling device on a motherboard, the apparatus comprising:
    a mounting bracket adapted for physical communication with the motherboard;
    a mounting boss configured to attach to the mounting bracket, the mounting boss alignable in a first orientation with a first hole spacing in the motherboard, and alignable in a second orientation with a second hole spacing in the motherboard; and
    a boss backing adapted to connect through the motherboard with the mounting boss in either the first orientation or the second orientation.

2. The apparatus of claim 1 further comprising a screw configured to connect the mounting boss with the boss backing.

3. The apparatus of claim 2 further comprising a spring disposed in the mounting boss, the spring biasing the screw toward a retracted position in the mounting boss.

4. The apparatus of claim 1 wherein the mounting boss has an offset portion adapted to align with the first hole spacing in the motherboard when the mounting boss is in the first orientation, and adapted to align with the second hole spacing in the motherboard when the mounting boss is in the second orientation.

5. The apparatus of claim 1 wherein the boss backing has an offset portion adapted to align with the first hole spacing in the motherboard when the boss backing is in the first orientation, and adapted to align with the second hole spacing in the motherboard when the boss backing is in the second orientation.

6. The apparatus of claim 1 wherein the mounting boss has a hook and a notch adapted to snap fit the mounting boss to the mounting bracket.

7. The apparatus of claim 1 wherein the boss backing has a hook and a notch adapted to snap fit the boss backing to a backing plate.

8. A computer comprising:
    a motherboard having an electrical component;
    a mounting bracket in thermal communication with the electrical component;
    a mounting boss configured to attach to the mounting bracket, the mounting boss alignable in a first orientation with a first hole spacing in the motherboard, and alignable in a second orientation with a second hole spacing in the motherboard; and
    a boss backing adapted to connect through the motherboard with the mounting boss in either the first orientation or the second orientation.

9. The computer of claim 8 further comprising a screw configured to connect the mounting boss with the boss backing.

10. The computer of claim 9 further comprising a spring adapted to bias the screw toward a retracted position in the mounting boss.

11. The computer of claim 8 wherein the mounting boss has an offset portion adapted to align with the first hole spacing in the motherboard when the mounting boss is in the first orientation, and adapted to align with the second hole spacing in the motherboard when the mounting boss is in the second orientation.

12. The computer of claim 8 wherein the boss backing has an offset portion adapted to align with the first hole spacing in the motherboard when the boss backing is in the first orientation, and adapted to align with the second hole spacing in the motherboard when the boss backing is in the second orientation.

13. The computer of claim 8 wherein the mounting boss has a hook and a notch adapted to snap fit the mounting boss to the mounting bracket.

14. The computer of claim 8 wherein the boss backing has a hook and a notch adapted to snap fit the boss backing to a backing plate.

15. An apparatus for mounting a cooling device on a motherboard, the apparatus comprising:
   a mounting boss alignable in a first orientation with a first hole spacing in the motherboard, and alignable in a second orientation with a second hole spacing in the motherboard; and
   a boss backing adapted to connect through the motherboard with the mounting boss in either the first orientation or the second orientation.

16. The apparatus of claim 15 further comprising a screw configured to connect the mounting boss with the boss backing.

17. The apparatus of claim 15 wherein the mounting boss has an offset portion adapted to align with the first hole spacing in the motherboard when the mounting boss is in the first orientation, and adapted to align with the second hole spacing in the motherboard when the mounting boss is in the second orientation.

18. The apparatus of claim 15 wherein the boss backing has an offset portion adapted to align with the first hole spacing in the motherboard when the boss backing is in the first orientation, and adapted to align with the second hole spacing in the motherboard when the boss backing is in the second orientation.

19. The apparatus of claim 15 wherein the mounting boss has a hook and a notch adapted to snap fit the mounting boss to a mounting bracket.

20. The apparatus of claim 15 wherein the boss backing has a hook and a notch adapted to snap fit the boss backing to a backing plate.

* * * * *